United States Patent [19]

Liu et al.

[11] Patent Number: 5,194,477
[45] Date of Patent: Mar. 16, 1993

[54] FLAME RETARDANT COMPOSITIONS

[75] Inventors: Ping Y. Liu, Naperville, Ill.; Linda McIntosh, Evansville, Ind.

[73] Assignee: General Electric Company, Pittsfield, Mass.

[21] Appl. No.: 614,515

[22] Filed: Nov. 16, 1990

[51] Int. Cl.$^5$ ............ C08L 67/02; C08L 69/00; C08L 79/08; C08K 3/22

[52] U.S. Cl. .................... 524/382; 524/399; 524/409; 524/410; 524/412; 525/66; 525/67; 525/425; 525/433

[58] Field of Search ............ 524/382, 399, 409, 410, 524/412; 525/66, 67, 425, 433

[56] References Cited

U.S. PATENT DOCUMENTS 4,639,486 1/1987 Liu ..................................... 525/425

*Primary Examiner*—David J. Buttner
*Attorney, Agent, or Firm*—Andrew C. Hess

[57] ABSTRACT

Flame retardant polyester compositions exhibiting good processability comprising at least one polyester resin and a flame retardant additive comprising a halogenated polycarbonate resin and an antimony compound in a polyetherimide ester elastomer resin carrier.

26 Claims, No Drawings

FLAME RETARDANT COMPOSITIONS

This invention relates to flame retardant thermoplastic molding compositions, particularly thermoplastic polyesters and mixtures of polyesters and polycarbonates, having incorporated therein a novel flame retardant additive for such thermoplastic compositions. More particularly, disclosed are flame retardant polyester compositions having good physical properties and exhibiting good processability comprising a polyester resin, preferably a poly(butylene terephalate) resin; and a flame retardant amount of a novel flame retardant comprised of (1) an antimony compound; (2) a halogenated polycarbonate resin and (3) a polyetherimide ester elastomeric resin. The novel flame retardant additive of the present invention can also be utilized effectively in polyester compositions modified with a polycarbonate resin.

In addition to the optional use of a polycarbonate resin in the compositions of the present invention, said compositions can also optionally advantageously contain one or more of a resinous impact enhancer and/or a mineral reinforcing agent.

BACKGROUND OF THE INVENTION

High molecular weight polyesters and particularly polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539. These patents disclose that the polyesters are particularly useful as film and fiber-formers.

With the development of molecular weight control, the use of nucleating agents and two-step molding cycles, poly(ethylene terephthalate) has become an important constituent of injection moldable compositions. Further, poly(1,4-butylene terephthalate), because of its very rapid crystallization from the melt, is uniquely useful as a component in such compositions. Work pieces molded from such polyester resins, in comparison with other thermoplastics, offer a high degree of surface hardness and abrasion resistance, high gloss, and lower surface friction.

Furthermore, in particular, poly(1,4-butylene terephthalate) is much simpler to use in injection molding techniques than poly(ethylene terephthalate). For example, it is possible to injection mold poly (1,4-butylene terephthalate) at lower mold temperatures of from about 450° F. to 500° F. to produce highly crystallized parts in short cycle times. On account of the high rate of crystallization, even at low mold temperatures, no difficulty is encountered in removing the moldings from the molds.

It is also known to add certain additives to thermoplastic polyesters to enhance or provide certain properties. For example, Rein et al, U.S. Pat. No. 3,405,198, disclose the use of polyethylene in poly(ethylene terephthalate) as an impact modifier. Holub et al, U.S. Pat. No. 4,122,061, disclose polyester compositions which comprise a poly(1,4-butylene terphthalate) resin, a poly(ethylene terephthalate) resin, a fibrous glass reinforcement, alone or in combination with a mineral filler and, as an impact modifier therefore, a polyolefin or olefin based copolymer resin including polyethylene and propylene-ethylene copolymer. Cohen et al, U.S. Pat. No. 4,185,047, disclose the use of high pressure low density polyethylene in thermoplastic polyester compositions, particularly poly(ethylene terephthalate) and poly(1,4-butylene terephthalate) for improved part releasability. All of the aforementioned patents are incorporated herein by reference.

However, it has been discovered that is difficult to render such polyester resins, modified or unmodified, flame retardant without sacrificing some of their inherent superior physical properties. Specifically, the use of conventional flame retardant additives may tend to prove detrimental to certain physical properties of the flame retardant polyester composition. One such property that may be hindered is the material processability, including the melt viscosity, of the resulting flame retardant composition. It has generally been discovered that superior processing is exhibited, for example, by tests that measure the melt viscosity of a given material, and that, as a rule, the lower the melt viscosity of a given polyester material the better is its ability to be processed in a typical commercial operation.

It has surprisingly been discovered that standard polyester flame retardant compositions, when modified with a novel flame retardant additive composition that is comprised of a halogenated polycarbonate resin, an antimony compound and a polyetherimide ester elastomer have superior processing properties than polyester compositions not modified with this novel flame retardant additive or modified with conventional flame retardant compositions. This superior processability may be shown by the lower melt viscosity exhibited by examples of the present invention over a control sample formulated with a conventional flame retardant additive. In addition, it has been discovered that various other physical properties of polyester compositions formulated with the novel concentrate of the present invention are comparable to those properties exhibited by the control samples.

In summary, it has been unexpectedly discovered that specified polyesters can be compatibly and advantageously made flame retardant with a specified flame retardant additive.

DETAILED DESCRIPTION OF THE INVENTION

The preferred polyesters utilized in the present invention are higher molecular weight polyesters, most preferably linear polymeric glycol esters of terephthalic acid and isophthalic acids. They can be prepared by known techniques such as by the alcoholysis of esters of the phthalic acid with a glycol and subsequent polymerization, by heating glycols with the free acids or with halide derivatives thereof, or by similar processes. These are described in U.S. Pat. Nos. 2,465,319 and 3,047,539, and elsewhere. In addition to the phthalates, amounts, e.g., from about 0.5 to 15% by weight, of other aromatic dicarboxylic acids, such as naphthalene dicarboxylic acid, can be present in the polyester component. Although the term "linear" is used, the reactants can also include amounts of tri- or polyfunctional branching agents, such as trimethylolpropane, pentaerythritol, and trimethyl trimesate.

Preferred polyesters will be of the family consisting of high molecular weight, polymeric glycol terephthalates or isophthalates having repeating units of the general formula:

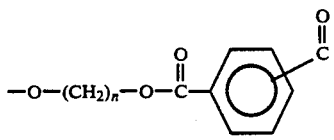

wherein n is an integer of from 2 to 10, preferably from 2 to 4, and mixtures of such esters, including copolyesters of terephthalic and isophthalic acids of up to about 30 mole % isophthalic units.

Especially preferred polyesters are poly(ethylene terephthalate) and a poly(butylene terephthalate), mixtures thereof, and most preferably poly(1,4-butylene terephthalate).

These polyesters may be advantageously modified by being blended with a polycarbonate resin. In addition, these resins can be blended with a resinous impact enhancer or a reinforcing agent.

According to the present invention, these polyester resins are formulated with a flame retardant additive which comprises a halogenated polycarbonate resin, an antimony compound and a polyetherimide ester elastomer resin carrier.

One component of the flame retardant concentrate of the present invention is a polyetherimide ester elastomer resin.

The polyetherimide ester elastomers of the present invention are well known elastomers and are described in U.S. Pat. Nos. 4,544,734 and 4,566,705 to McCready and in U.S. Pat. No. 4,566,688 to McCready et al., all of which are incorporated herein by reference.

The polyetherimide ester elastomers utilized in the invention contain imide groups, polyether groups, and ester groups in the polymer chain. They are comprised of the reaction products of:
 (i) at least one diol;
 (ii) at least one dicarboxylic acid or its ester forming reactive derivative; and
 (iii) a set of reactants selected from
    (a)(1) at least one high molecular weight poly(oxy alkylene)diamine, and (2) at least one tricarboxylic acid or its derivative, or
    (b) at least one high molecular weight polyoxyalkylene diimide diacid.

Suitable diols (i) for use in the preparation of the polyetherimide ester polymers of the present invention include the saturated and unsaturated aliphatic and cycloaliphatic dihydroxy compounds as well as the aromatic dihydroxy compounds. These diols are preferably of a low molecular weight, i.e. having a molecular weight of about 300 or less. When used herein, the term "diol" and "low molecular weight diol" should be construed to include equivalent ester forming derivatives thereof, provided, however, that the aforementioned molecular weight requirement pertains to the diols only and not to their ester forming derivatives. Exemplary of ester forming derivatives of diols there may be given the acetates of the diols as well as, for example, ethylene oxide or ethylene carbonate for ethylene glycol.

The preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3-and 1,4- cyclohexane dimethanol, butenediol, hexene-diol, etc. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy naphthalene, 4,4'-dihydroxy diphenyl, bis(p-hydroxy phenyl) methane and bis(p-hydroxy phenyl)-2,2-propane.

Especially preferred diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic, and/or aromatic dicarboxylic acids. These acids are preferably of a low molecular weight, i.e., having a molecular weight of less than about 300. However, in some cases higher molecular weight dicarboxylic acids may be used. The term "dicarboxylic acids", as used herein, includes equivalents of dicarboxylic acids having two functional carboxyl groups which perform substantially like dicarboxylic acids in reaction with glycols and diols in forming polyesters. These equivalents include esters and ester forming reactive derivatives, such as acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids ay contain any substituent group(s) or combinations which do not substantially interfere with the polymer formation and use of the polyetherimide ester polymer.

Aliphatic dicarboxylic acids, as the term is used herein, refer to carboxylic acids having two carboxyl groups each of which is attached to a saturated carbon atoms. If the carbon atom to which the carboxyl group is attached is saturated and is in a ring, the acid is cycloaliphatic.

Aromatic dicarboxylic acids, as the term is used herein, are dicarboxyic acids having two carboxyl groups each of which is attached to a carbon atom in an isolated or fused benzene ring system. It is not necessary that both functional carboxyl groups be attached to the same aromatic ring and where more than one ring is present, they can be joined by an aliphatic or aromatic divalent radical such as —O— or —SO$_2$—.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1,2-dicarboxylic acid, 2-ethylsuberic acid, tetramethylsuccinic acid, cyclopentanedicarboxylic acid, decahydro-1,5 naphthlene dicarboxylic acid, 4,4'-bicyclohexyl dicarboxylic acid, decahydro-2,6 naphthalene dicarboxylic acid, 4,4-methylenebis (cyclohexane carboxylic acid), 3,4-furan dicarboxylic acid, and 1,2-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-1,2-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$-$C_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8-16 carbon atoms are preferred, particularly the benzene dicarboxylic acids, i.e., phthalic, terephthalic and isophthalic acids and their dimethyl derivatives. Especially preferred is dimethylterephthalate.

Finally, where mixtures of dicarboxylic acids are employed in the practice of the present invention, it is preferred that at least about 60 mole %, preferably at least 80 mole %, based on 100 mole % of dicarboxylic acid (ii) be the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

The polyetherimide ester polymers of the present invention may be prepared by a one-pot synthesis involving the reaction of the diol (i), the dicarboxylic acid (ii), the high molecular weight poly(oxy alkylene)diamine (iii)(a)(1), and the tricarboxylic acid or its derivative (iii)(a) (2). In such a synthesis the polyoxyalkylene diimide diacid (iii)(b) is formed in-situ by the reaction of the poly(oxy alkylene)diamine with the tricarboxylic acid.

The poly(oxy alkylene)diamines (iii)(a)(1) suitable for use in the present invention may be represented by the following general formula:

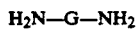    I.

wherein G is the radical remaining after the removal of the amino groups of a long chain alkylene ether diamine. These polyether diprimary diamines are available commercially from Texaco Chemical Company under the trademark JEFFAMINE. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating glycol with ammonia and hydrogen over a Nickel-Copper-Chromium catalyst as taught by U.S. Pat. No. 3,654,370. Other methods for the production thereof include those taught by U.S. Pat. Nos. 3,155,728 and 3,236,895 and French Nos. 1,551,605 and 1,466,708, all of the foregoing patents being incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether) diamines including poly(ethylene ether)diamine, poly(propylene ether) diamine, poly(tetramethylene ether)diamine; random or block copolymers of ethylene oxide and propylene oxide including propylene oxide and poly(propylene oxide); terminated poly(ethylene ether)diamine; and aminated random or block copolymers or tetrahydrofuran with minor amounts of a second monomer such as ethylene oxide, propylene oxide, and methyl tetrahydrofuran (used in proportions such that the carbon-to-oxygen mole ration in the diamine does not exceed about 4.3 to 1). Polyformyl diamines prepared by reacting formaldehyde with diols such as 1,4-butanediol and 1,5-pentanediol and subsequently aminating are useful. Especially preferred poly(alkylene ether) diamines are poly(propylene ester)diamine, poly(tetramethylene ether)diamine, and the poly(ethylene) glycols which are end-capped with poly(propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-diphenyl tricarboxylic anhydride, 3,3',5-benzophenone tricarboxylic anhydride, 1,3,4-cyclopentane tricarboxylic anhydride, 2,2',3-diphenyl tricarboxylic anyhydride, diphenyl sulfone-3,3',4-tricarboxylic anhydride, ethylene tricarboxylic anydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula:

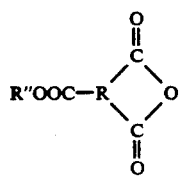    II.

wherein:
R is a trivalent organic radical, preferably a $C_1$-$C_{20}$ aliphatic or cycloaliphatic, or $C_6$-$C_{20}$ aromatic trivalent radical;

R" is preferably hydrogen or a monovalent organic radical which is preferably selected from $C_1$–$C_6$ aliphatic and/or cycloaliphatic radicals and $C_6$–$C_{12}$ aromatic radicals, e.g., benzyl; R" is most preferably hydrogen.

In the preparation of the instant polyetherimide ester polymers sufficient amounts of diol versus dicarboxylic acid, and tricarboxylic acid versus diamine must be present, as recognized in the art, to allow for substantially complete polymerization.

This type of one-pot reaction involving the reactions of (i) a diol component, (ii) a dicarboxylic acid component, (iii)(a)(1) a poly (oxy alkylene)diamine component, and (iii)(a)(2) a tricarboxylic acid component is described in U.S. Pat. No. 4,555,688 to McCready et al. incorporated herein by reference. In this type of one-pot reaction the amount of diol (i) employed will be, in general, a molar excess, preferably about 1.5 molar equivalents, based on the combined molar equivalents of dicarboxylic acid (ii) and of the total moles of tricarboxylic acid (iii)(a)(2). The amount of the tricarboxylic acid employed will preferably be about two molar equivalents based on the number of moles of the poly(oxy alkylene)diamine. Obviously, less than two molar equivalents would result in incomplete imidization of the diamine resulting in potentially poorer properties. Conversely, greater than two molar equivalents of the tricarboxylic acid may lead to cross-linking and/or branching of the polymer. Generally, mole ratios of 2 moles tricarboxylic acid to 0.85 to 1.15 moles of poly(oxy alkylene)diamine yield useful polymers.

The amount by which the diamine (iii)(a)(1) and the dicarboxylic acid (ii) are used is generally not critical in forming the polyetherimide esters of the present invention. However, preferred amounts of the poly(oxy alkylene)diamine and dicarboxylic acid used are such that the weight ratio of the theoretical amount of the polyoxyalklyene diimide diacid, formable from the poly(oxy alkylene)diamine and the tricarboxylic acid, to the dicarboxylic acid is from about 0.002 to 2.0:1, preferably from about 0.01 to 2.0:1, more preferably from about 0.25 to 2.0, and most preferably from about 0.4 to 1.4:1. The actual weight ratio will be dependent upon the specific poly(oxy alkylene)diamine and tricarboxylic acid used and more importantly upon the desired physical and chemical properties of the resultant polyetherimide ester. In general, the lower ratio of the theoretical amount of polyoxyalkylene diimide diacid to dicarboxylic acid the better the strength, crystallization and heat distortion properties of the polymer. Alternatively, the higher the ratio, the better the flexibility, tensile property and low temperature impact characteristics.

The instant polyetherimide esters may also be prepared by a two-pot synthesis involving the reaction of the diol (i), the dicarboxylic acid (ii) and the polyoxyalkylene diimide diacid (iii)(b). Such a reaction is described in U.S. Pat. No. 4,556,705 to McCready, incorporated herein by reference. Basically, in this process the poly(oxy alkylene)diamine is reacted with the tricarboxylic acid to form a polyoxyalkylene diimide diacid, and the preformed polyoxyalkylene diimide diacid is then reacted with the diol and the dicarboxylic acid to form the polyetherimide ester polymers.

The polyoxyalkylene diimide diacid (iii)(b) may be represented by the general formula

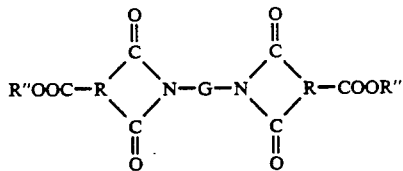

wherein G, R and R" are as defined above.

The polyoxyalkylene diimide diacids of formula III suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly(oxy alkylene)diamine (iii)(a)(1). These polyoxyalkylene diimide diacids and processes for their preparation are disclosed in U.S. Pat. No. 4,556,705, incorporated herein by reference. Briefly, these polyoxyalkylene diimide diacids may be prepared by known imidization processes including melt synthesis or by synthesizing in a solvent system. Such reactions generally occur at temperatures from about 100° C. to about 300° C., preferably at temperatures from about 150° C. to about 250° C., while drawing off water or in a solvent system at the reflux temperature of the solvent or azeotropic (solvent) mixture.

In this two-pot process, as in the one-pot process described hereinabove, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol generally allows for optimal yields, based on the amount of acids, while accounting for the loss of diol during esterification.

In this two-pot process the amount of polyoxyalkylene diimide diacid and dicarboxylic acid utilized is generally not critical in forming the polyetherimide esters of the present invention. However, preferred amounts of the polyoxyalkylene diimide diacid and dicarboxylic acid are such that the weight ratio of the polyoxyalkylene diimide to the dicarboxylic acid is from about 0.002 to 2.01:1, preferably from about 0.01 to 2.01:1, more preferably from about 0.25 to 2.0:1, and most preferably from about 0.4 to 1.4:1.

It is also possible, as described in U.S. Pat. No. 4,556,688, to prepolymerize the aromatic dicarboxylic acid and the diol to form a prepolyester, and then react this prepolyester with either the diimide diacid or with the tricarboxylic acid and the poly(oxy alkylene) diamine. Forming the prepolyester can be achieved by conventional esterification techniques such as those described in U.S. Pat. Nos. 2,465,319 and 2,910,466, all of which are incorporated by reference.

In its preferred embodiment, the polyetherimide esters of the instant invention comprise the reaction products of dimethylterephthalate, optionally with up to 40 mole percent of another dicarboxylic acid or its ester forming derivative; butane diol, optionally with another diol such as butene diol, hexandediol, or cyclohexane dimethanol; and either a poly(oxy alkylene)diamine having an average molecular weight of from about 600 to about 12,000, preferably from about 900 to about 4,000, and trimellitic anhydride, or a polyoxyalkylene diimide diacid.

Where all of the reactants are charged to the reactor together or where the polyoxyalkylene diimide diacid is preformed and excess tricarboxylic acid is present, a minor amount of the tricarboxylic acid or anhydride may react with available hydroxyl groups and ultimately function as a branching agent in the finished polymer. Within limits, the degree of ranching in the finished polymer can be controlled by varying the mole ratio of tricarboxylic acid to poly(oxy alkylene)diamine. An excess of diamine reduces the degrees of branching, while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching, it should be noted that polymers of this invention, when prepared from preformed diimide diacid, are substantially free of branching. If branching is desired, one needs only to introduce a branching agent, such as trimellitic anhydride, along with the preformed diimide diacid. The amount of branching agent will generally be less than about 0.15 moles per mole of diimide diacid. Useful branching agents other than trimellitic anhydride include trimethyl trimellitate, glycerol, trimethylol propane, trimesic acid and its esters, and the like.

The instant polyetherimide esters may be prepared by conventional esterification/condensation reactions for the production of polyesters. These processes are described, inter alia, in U.S. Pat. Nos. 3,763,109; 3,651,014; 3,801,547; 4,556,705, and 4,556,688, all of which are incorporated herein by reference.

The polyetherimide esters of the instant invention contain at least the following two recurring structural units:

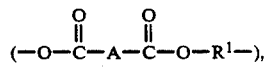
IV.

and

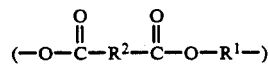
V.

wherein:
A is the residue of the polyoxyalkylene diimide diacid absent the two carboxyl groups, i.e.,

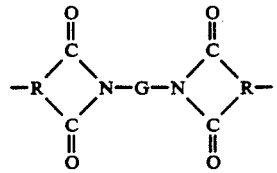

R¹ is the residue of the diol absent the two hydroxyl groups,
R² is the residue of the dicarboxylic acid absent the two carboxyl groups, and
G is as defined hereinbefore.

Additionally, while not required, it is customary and preferred to utilize a catalyst or catalyst system in the process for the production of the present polyetherimide esters. These types of catalysts are set forth in U.S. Pat. Nos. 4,556,705 and 4,566,688, both of which are incorporated herein by reference.

Both batch and continuous methods can be used for any stage of the ether imide ester polymer preparation. Polycondensation of the polyester prepolymer with the polyoxyalklene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer.

The second component of the flame retardant composition of the present invention is a halogenated polycarbonate resin.

Preferred halogenated polycarbonate resins are those derived from, at least in part, halogenated dihydric phenols. These include high and low molecular weight polycarbonates and copolycarbonates as well as the diglycidyl ethers of dihydric phenols. The former may be prepared by reacting the dihydric phenol with a carbonate precursor, e.g. carbonyl bromide or carbonyl chloride and, optionally, other dihydric phenols, glycols and/or dicarboxylic acids. The latter may be prepared by the reaction of dihydric phenol with a glycidyl or a glycidyl generating monomer such as epichlorohydrin. Suitable examples of the halogenated divalent phenols that may be employed in the preparation of the carbonate and the epoxy resins include 2,2-bis(3,5-dibromo-4-hydroxyphenyl) propane, 2,2-bis(3,5-dichloro-4-hydroxyphenyl) propane, bis(3,5-dibromo-4-hydroxyphenyl) methane, bis(3,5-dichloro-4-hydroxyphenyl) methane, 2,2-bis(4-hydroxy-2,3,5,6-tetrabromophenyl) propane, 2,2-bis(4-hydroxy-2,3,5,6-tetrachlorophenyl) propane, or the like. The most preferred halogenated dihydric phenol is 2,2-bis(3,5-dibromo-4-hydroxyphenol) propane, wherein said carbonate polymer or copolymer and epoxy resin will have repeating units of formula VI and VII respectively.

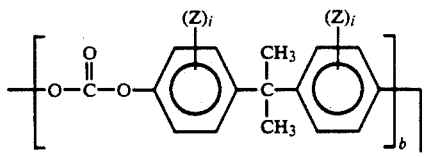
V.

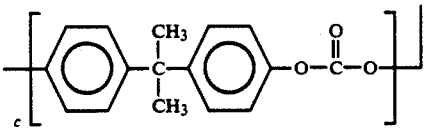

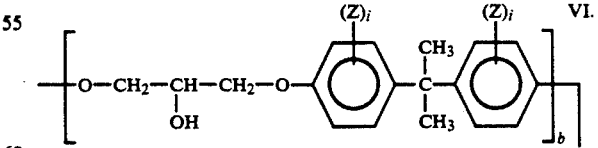
VI.

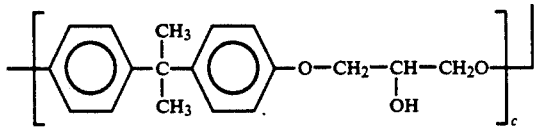

wherein Z is a halogen atom, preferably, bromine or chlorine; b and c are, independently, whole numbers, including zero, and i is a whole number from 1–4, preferably 2.

Preferred halogenated carbonate polymer flame retardants are (1) those having 25 to 75, preferably 30 to 45, weight percent of the repeating units comprising the chloro- or bromo-substituted dihydric phenol units and the remainder comprising dihydric phenol, glycol or dicarboxyic acid units and (2) low molecular weight tetrabromobisphenol A polycarbonates of 2 to 10, preferably 4 to 7 repeating units and end capped with tribromophenol.

Obviously, these polymeric flame retardants have as terminal groups, reactive monomers from which they are derived, e.g. the dihydric phenol, carbonyl halide or a glycidyl group, or, particularly in the case of the low molecular weight polymers, they may be terminated by the use of chain stoppers which are monofunctional and reactive with the end groups of the repeating units. Suitable chain stoppers will be known to those skilled in the art and include, generally, monohydroxy compounds, e.g., methanol, ethanol, phenol, etc.; monocarboxylic acids or acid halides, among others. Particularly suitable are halogenated, e.g., bromine or chlorine, chain stoppers as for example the $Br_1$ to $Br_5$ to $Cl_1$ or to $Cl_5$ substituted phenols, especially tribromophenol.

The molecular weight of the halogenated polycarbonates may vary widely and are generally from 2000 to 40,000. A preferred high molecular weight halogenated carbonate polymer will have a molecular weight ranging from about 20,000 to about 40,000. Also, the halogen content of the halogenated carbonate material may vary widely. The preferred halogen content is from about 20% to greater than about 80% by weight, preferably from about 35% to about 70%.

Commercially available halogenated carbonates which may be used in the practice of this invention include, but are not limited to, the following: (A) Tribromophenol end capped poly(tetrabromobisphenol A) carbonate commercially available as BC 58 from Great Lakes Chemical Corporation; (B) high molecular weight Bisphenol A/tetra-bromobisphenol A copolycarbonate commercially available as LEXAN® RL 1624 from General Electric Company; (C) poly(tetrabromo bisphenol A glycidyl ether) resin (MW 20,000–40,000) commercially available as Thermoguard 240 from M&T Chemicals, Inc.

The third component of the flame retardant composition of the present invention is an inorganic or organic antimony compound.

The inorganic or organic antimony compounds utilized in the flame retardant additive are widely available or can be made in known ways. For example, as inorganic compounds there can be used antimony oxide, antimony trioxide, antimony phophate, $KSb(OH)_6$, $NH_4SbF_3$ and the like. A wide variety of organic antimony compounds can also be used such as antimony esters with organic acids, cyclic alkyl antimonates, aryl antimonic acids and the like. Illustrative of organic antimony compounds, including inorganic salts of such compounds are: KSb tartrate; Sb caproate; $Sb(OCH_2CH_3)_3$; $Sb(OCH(CH_3)CH_2CH_3)_3$; sodium antimonate; Sb polymethylene glycolate; polyphenylene antimony; and the like. Especially preferred are antimony oxide, antimony trioxide and sodium antimonate.

The flame retardant additive may also optionally be utilized with an effective amount of a drip inhibitor. This amount will generally be from 0.01 to about 5 parts by weight, preferably from about 0.05 to about 2.0 parts by weight, based on 100 parts of the total composition, that is, the polyester resin, the flame retardant additive and any additional components. Suitable non-dripping agents are well known and widely available. They include the fumed and colloidal silicas and polytetrafluoroethylene resins. Especially preferred are the polytetrafluoroethylene resins, most preferably TEFLON® 6 from E.I. DuPont.

The manner of adding the flame retardant additive to the polyester compositions of the present invention is not critical; suitable methods are conventional and would be obvious to those skilled in the art.

The polyester composition of the present invention may optionally contain a mineral reinforcing agent or a filler. With regard to fillers, the preferred filler is a silica type mineral filler. When a filler is employed, it is generally used in amounts ranging from about 5 to about 150 parts by weight, preferably from about 15 to about 100 parts by weight, and most preferably from about 20 parts to about 50 parts by weight, of a silica type mineral filler, based on 100 parts by weight of the other components in the composition. Examples of suitable silica mineral fillers that can be utilized in the present invention include aluminum silicates, calcium silicate, clays, fumed silica, kaolin, mica, pyrogenic silica, and most preferably talc.

The preferred silica type reinforcing agent is fibrous (filimentous) glass.

The filamentous glass to be employed as reinforcement in such embodiments of the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air flame blowing and mechanical pulling. The preferred filaments for plastics reinforcements are made by mechanical pulling. The filament diameters range from about 0.00012 to 0.00075 inch, but this is not critical to the present invention. The length of the glass filaments is also not critical to the invention. However, in preparing the molding compositions, it is convenient to use the filamentous glass in the form of chopped strands of from about one-eighth to about two inches long. In articles molded from the compositions, on the other hand, even shorter lengths will be encountered because, during compounding considerable fragmentation will occur. This is desirable, however, because the best properties are exhibited by thermoplastic injection molded articles in which the filament lengths lie between about 0.0005 to 0.250 inch.

According to the present invention, the glass filaments will be utilized in any amount that will improve the desired properties of the finished article, keeping in mind that the use of such filaments is optional. Generally, however, these filaments may be used in amounts ranging from about 5 weight percent to about 70 weight percent, preferably from about 8 to about 55 weight percent, and most preferably from about 10 to about 35 weight percent of the total resin component present in the composition of the invention.

The composition of the present invention may also comprise an impact modifier. The preferred impact modifier comprises core-shell rubber core poly(meth)a- crylate outer shell polymers. These resins can be made in known ways and they are available from a number of sources, e.g., Rohm & Haas Company, Philadelphia, under the trade designations Acryloid KM330 and KM653. Acryloid ® KM330 is a core shell polymer comprising 40/60 methyl methacrylate shell/n-butyl acrylate polymer core. Other useful multi-stage polymers are available from the Kanagafuchi Co., Japan. In general, any of the polyalkyl methacrylates described in Brinkmann et al., U.S. Pat. No. 3,591,659 can be used, especially those containing units derived from n-butyl acrylate. Preferably, the polyacrylate resin will be in the form of a rubber elastic graft copolymer having a glass transition temperature < −20° C. as described in Schlichting et al., U.S. Pat. No. 4,022,748. Especially preferably, the polyacrylate will comprise a multiple stage polymer having a rubbery first stage and a thermoplastic hard final stage, as described in Farnham et al., U.S. Pat. No. 4,096,202, and Avakian et al., U.S. Pat. No. 4,587,272, incorporated herein by reference.

The polyacrylate impact-modifier described above, e.g., KM ® 330, can be added to the other resinous components of the invention in a concentrate form, e.g., in ethylene ethyl acrylate copolymer resins.

The impact modifier utilized herein may, as mentioned, also comprise an acrylic or methacrylic monomer grafted polymer of a conjugated diene alone or copolymerized with a vinyl aromatic compound. Preferably, the core shell polymers of the type available from Rohm and Haas under the trade designation ACRYLOID KM ® 653 are used, especially those containing units derived from butadiene or isoprene, alone or in combination with a vinyl aromatic compound. These are described in Fromuth et al., U.S. Pat. No. 4,180,494. Butadiene-type core-shell polymers suitable for use in the compositions of this invention are well known and are described for instance in U.S. Pat. No. 4,180,494, the disclosure of which is incorporated herein by reference. Especially preferably, the copolymer component will comprise a three stage polymer having a butadiene based rubbery core, a second stage polymerized from styrene and a final stage or shell polymerized from methyl methacrylate and 1,3-butylene glycol dimethacrylate or will comprise a two stage polymer having a butadiene based rubbery core and a 2nd stage or shell polymerized from methyl methacrylate and 1,3-butylene glycol dimethacrylate.

The impact modifier suitable for use in the present invention can also comprise an acrylonitrile-butadiene-styrene (ABS) graft copolymer, which are well known to those skilled in the art.

Particularly suitable ABS-type impact modifiers can be produced according to the procedures as set forth in U.S. Pat. No. 4,764,563, which is incorporated herein by reference.

This patent teaches that such impact modifiers are prepared by grafting particular ratios of styrene and acrylonitrile on butadiene based rubber substrates.

Specifically, these impact modifiers are ABS graft copolymer resins prepared by graft polymerizing particular ratios of styrene and acrylonitrile in the presence of particular styrene-butadiene rubber substrates.

The butadiene based rubber substrates useful in preparing such impact modifiers are conventional copolymers of styrene and butadiene which optionally include up to 15 wt. % of acrylonitrile and/or an alkyl acrylate in which the alkyl group contains 4 or more carbon atoms, and comprise from 50 to 95 wt. % butadiene and from 5 to 50 wt. % styrene. The rubber substrate may further include from 0–2 wt. % of additional copolymerizable cross-linking monomers such as divinylbenzene, triallylcyanurate or the like, up to 2 wt. % of chain transfer agents, such as tertiary dodecyl mercaptan, and up to 2 wt. % of graft enhancers such as alkyl methacrylate, diallylmaleate and the like. Diene polymer and copolymer rubbers are well known and widely employed commercially for a number of purposes. The preparation of such rubbers may be accomplished by any of a variety of processes well known and conventionally used. Particularly used are emulsion polymerization processes which provide the rubber in latex form suitable for use in subsequent graft polymerization processes.

These ABS-type impact modifiers suitable for use in this invention are prepared by graft polymerizing from about 40 to about 70, preferably from 47 to 61 parts by weight of a grafting monomer mixture comprising a monovinyl aromatic compound (MVA), such as styrene, a methyl styrene, p-methyl styrene or a combination thereof and an ethylenicaly unsaturated nitrile (EUN) such acrylonitrile and/or methacrylonitrile in the presence of 100 parts by weight of butadiene based rubber substrate. The impact modifier is thus a high rubber graft copolymer having a rubber content of from about 50 to about 80 wt. %, preferably from 52 to 78 wt. % and, correspondingly, a graft monomer component or superstrate of from about 50 to 20, preferably from 48 to 22 wt. %.

The weight ratio of the MVA to the EUN in the grafting monomer mixture will be in the range of from 3/1 to 5/1. and preferably, from 3.8/1 to 4.2/1.

This graft polymerization of the MVA/EUN monomer mixture in the presence of the rubbery substrate may be carried out by any of the graft polymerization processes well known and widely used in the polymerization art for preparing ABS resins, including emulsions, suspension and bulk processes. Typical of such processes are emulsion graft polymerization processes wherein the grafting monomers are added together with surfactants and chain transfer agents as desired, to an emulsion latex of the rubbery substrate and polymerized using an initiator. The initiator may be any of the commonly used free-radical generators including peroxides such as alcumyl peroxide or azo initiators such as axobisisobutyronitrile. Alternatively, any of the variety of redox polymerization catalysts such as the combination of cumene hydroperoxide with ferrous sulfate and sodium formaldehyde sulfoxylate which are well known and widely used in such processes may be employed. The graft polymerization process used in the preparation of the impact modifiers of this invention, as well as those processes used in coagulating and isolating the impact modifier for further use, are thus well known and conventional, and the application of such processes to the preparation of the impact modifiers for further use, are thus well-known and conventional, and the apparent to those skilled in the art.

The impact polymer suitable for use in the present invention may also comprise a styrenic polymer which comprises a rigid portion and a rubber portion. The rigid portion is formed from at least two ethylenically unsaturated monomers, one of which comprises styrene and/or substituted styrene. Preferred substituted styrenes include, but are not limited to, halogen-substituted styrene, particularly wherein the halogen is substituted on the armotic ring, alpha-methyl styrene and para-methyl styrene. The other ethylenically unsaturated monomer which is used in forming the rigid portion may be selected from acrylonitrile, substituted acrylonitriles, acrylates, alkyl, substituted acrylates, methacrylates, alkyl substituted methacrylates, and ethylenically unsaturated carboxylic acids, diacids, dianhydrides, acid esters, diacid esters, amides, imides and alkyl and aryl substituted imides. Preferably, the second monomer which is used to form the rigid portion is selected from the group consisting of acrylonitrile, methacrylonitrile, alkyl methacrylates, malaic, anhydride, maleimide, alkyl maleimides and aryl maleimides, and mixtures thereof. It is further preferred that the rigid portion is formed from about 60 to about 95 weight percent, and more preferably 60 to 80 weight percent, of the styrene and/or substituted styrene monomers, and from about 5 to about 40 weight percent, and more preferably 20 to 40 weight percent, of the second monomer.

The rubber portion may be formed from polymers or copolymers of one or more conjugated dienes, copolymers of conjugated dienes and non-diene vinyl monomers, alkyl acrylate polymers, and copolymers of ethylenically unsaturated olefins and non-conjugated diene polymers (EPDM) rubbers. A preferred rubber portion includes polybutadiene.

The styrenic polymer component may be formed such that the rigid portion is grafted to the rubber portion. Alternatively, the rigid portion may be blended with the rubber portion. When the rigid portion is blended with the rubber portion, it is preferred that the rubber portion has been previously grafted with one or more grafting monomers. Accordingly, the styrenic polymer component may be so produced by any method known in the art, for example, emulsion, bulk, mass or suspension polymerization processes. It is preferred that the styrenic polymer component contains from about 10 to 90 weight percent of the rubber portion and from about 10 to 90 weight percent of the rigid portion, based on the total of the rubber portion and the rigid portion. More preferably, the styrenic polymer component comprises from about 40 to about 80 weight percent of the rubber portion and from about 20 to about 60 weight percent of the rigid portion, based on the total of the rubber portion and the rigid portion.

The amount of the impact modifier can also vary widely. It has been found that even relatively minor amounts of the modifier are effective in providing significant improvements in impact strength over a range of low temperatures. The optimum amounts of optional impact modifier used will depend on the type of impact modifier employed. Generally, an impact modifier will be used used in amounts ranging from about 5 to about 75 parts by weight, preferably from about 10 to about 30 parts by weight based on 100 parts by weight of the total resin component, that is, the total of polyester resin, impact modifier resin, and polycarbonate resin, if any, utilized in the composition of the present invention.

As indicated, the composition of the present invention may also optionally include a polycarbonate resin.

Polycarbonates suitable for use in the present invention are any of those known in the art. Especially preferred polycarbonates are high molecular weight, thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an I.V. of 0.30 to 1.0 dl/g as measured in methylene chloride at 25° C. In on embodiment, the polycarbonates are derived from dihydric phenols and carbonate precursors and generally contain recurring structural units of the formula;

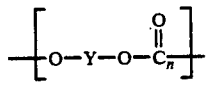

where Y is a divalent aromatic radical remaining after removal of the hydroxy groups from the dihydric phenol employed in the polycarbonate producing reaction, and n is greater than 1, preferably from about 10 to about 400.

Preferred polycarbonate resins are of the formula:

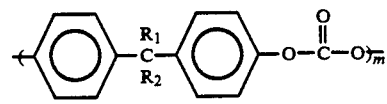

wherein $R_1$ and $R_2$ are independently hydrogen, (lower) alkyl or phenyl and m is at least 30, preferably between 40 and 300. The term (lower) alkyl includes hydrocarbon groups of from 1 to 6 carbon atoms.

Suitable dihydric phenols for producing polycarbonates include, for example, 2,2-bis(4-hydroxyphenyl)propane, bis(4-hydroxyphenyl)-methane, 2,2-bis(4-hydroxy-3-methylphenyl)propane, 4,4-bis(4-hydroxyphenyl)heptane, 2,2-(3,5,3',5'-tetrachloro-4-4'-dihydroxyphenyl)propane, 2,2(3,5,3',5'-tetrabromo-4,4'-dihydroxyphenol)propane, and 3,3'-dichloro-4,4'-dihydroxydiphenyl)methane.

Other dihydric phenols which are also suitable for use in the preparation of the above polycarbonates are disclosed in U.S. Pat. Nos. 2,999,835; 3,038,365; 3,169,121; 3,334,154; and 4,131,575, incorporated herein by reference.

It is, of course, possible to employ two or more different dihydric phenols or a copolymer of a dihydric phenol with a glycol or with a hydroxy or acid terminated polyester, or with a diabasic acid in the event a carbonate copolymer or interpolymer rather than a homopolymer is desired for use in the preparation of the blends of the invention. Blends of any of the above materials can also be employed to provide the aromatic polycarbonate. In addition, branched polycarbonates such as are described in U.S. Pat. No. 4,001,184, can also be utilized in the practice of this invention, as can blends of a linear polycarbonate and a branched polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate; a di(halophenyl)carbonate such as di(trichlorophenyl) carbonate, di(tribromophenyl)-carbonate, etc.; di(akylphenyl) carbonate such as di(tolyl)-carbonate, etc.; di(naphthyl)carbonate; di(chloronaphthyl)carbonate; etc., or mixtures thereof. The suitable haloformated include bis-haloformates of dihydric phenols (bischloroformates of hydroquinone, etc.) or glycols (bishaloformates of ethylene glycol, neopentyl glycol, polethylene glycol, etc.). While other carbonate precursors will occur to those skilled in the art, carbonyl chloride, also known as phosgene, is preferred.

The polycarbonate may also be a copolyestercarbonate as described by Clayton B. Quinn in U.S. Pat. No. 4,430,484 and Kenneth Miller in U.S. Pat. No. 4,465,820 and the references cited therein, incorporated herein by reference. Preferred polyestercarbonates are those derived from the dihydric phenols and carbonate precursors described above and aromatic dicarboxylic acids or their reactive derivatives, such as the acid dihalides, e.g. dichlorides. A quite useful class of polyestercarbonates are the aromatic polyestercarbonates derived from bisphenol A; terephthalic acid or isophthalic acid or a mixture thereof or their respective acid chlorides; and phosgene. If a mixture of terephthalic acid and isophthalic acid is employed, the weight ratio of terephthalic acid to isophthalic acid may be from about 2:8 to about 8:2.

The polycarbonates of the subject blends can be manufactured by known processes, such as, for example, by reacting a dihydric phenol with a carbonate precursor such as diphenyl carbonate or phosgene in accordance with methods set forth in the above-cited literature and U.S. Pat. Nos. 4,018,750 and 4,123,436, or by tranesterification processes such as are disclosed in the U.S. Pat. No. 3,151,008, as well as other processes known to those skilled in the art. The aromatic polycarbonates are typically prepared by employing a molecular weight regulator, an acid acceptor and a catalyst. The molecular weight regulators which can be employed include phenol, cyclohexanol, methanol, alkylated phenols, such as octylphenol, parateriary-butyl-phenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inroganic acid acceptor can be one which can be either a hydroxide, a carbonate, a bicarbonate, or a phosphate or an alkali or alkaline earth metal.

The catalyst which can be employed are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quarternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, promellitric acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride and trimellitic acid or their acid halide derivatives.

The amount of the optional polycarbonate resin utilized in the composition of the present invention can vary widely and is not critical to the present invention. Generally, the polycarbonate resin will be used used in amounts ranging from about 25 to about 500 parts by weight, preferably from about 50 to about 400 parts by weight, more preferably from about 100 to about 300 parts by weight, and most preferably from about 150 to about 250 parts by weight, based on 100 parts by weight of the polyester resin component.

The amount of the at least one polyester resin in the composition of the present invention will preferably range from about 15 parts to about 75 parts by weight, more preferably from about 20 to about 70 parts by weight, and most preferably from about 25 to about 65 parts by weight per one hundred parts by weight of the total composition.

Those skilled in the art are aware that the amount by which the flame retardant additive is used will vary with the nature of the resin or resin blend utilized in the composition, the amount of optional fillers utilized and other factors. In general, the amount of the flame retardant additive used in the composition of the present invention will preferably range from about 5 parts to about 50 parts by weight, more preferably from about 10 to about 30 parts by weight, and most preferably from about 12 to about 25 parts by weight per one hundred parts by weight of the total composition.

In the flame retardant additive, the halogenated polycarbonate resin is preferably present in amounts ranging from about 30 weight percent to about 85 weight percent, more preferably in amounts ranging from about 40 weight percent to about 75 weight, and most preferably in amounts ranging from about 60 to about 70 weight percent based on the total weight of the flame retardant additive; the antimony compound is preferably present in amounts ranging from about 5 weight percent to about 40 weight percent, more preferably from about 10 weight percent to about 35 weight percent and most preferably from about 20 weight percent to about 30 weight percent based on the total weight of the flame retardant additive; and the polyetherimide ester elastomer resin is preferably present in amounts ranging from about 10 weight percent to about 30 weight percent, more preferably in amounts ranging from about 12 weight percent to about 25 weight percent and most preferably in amount ranging from about 15 to about 20 weight percent based on the total weight of the flame retardant additive.

The components of the composition of the present invention can be intimately blended in a number of procedures. In one way, the flame retardant additive and any of the optional components of the invention are put into a dry tumbler with the dry polyester resin for better mixing, fed into a pre-heated extruder at an elevated temperature, e.g., 400°-450° F., and extruded to produce molding pellets. In another procedure, the aforementioned components are mixed with the polyester resin by blending at ordinary temperatures, then the blend is fluxed on a mill, heated, e.g., at 450°-550° F., then cooled and comminuted; or the blend can be extruded at 450°-550° F., cooled and chopped.

It should be understood that the composition obtained according to this invention may contain one or more conventional additives such as, for example, antioxidants, carbon black, reinforcing agents, plasticizers, lubricity promoters, color stabilizers, ultraviolet absorbers, X-ray opacifiers, dyes, pigments, fillers, mold release agents and the like. Satisfactory thermal, oxidative and/or ultraviolet stabilizers comprise phenols and their derivatives, amines and their derivatives, compounds containing both hydroxyl and amine groups, hdroxyazines, oximes, polymeric phenolic esters and salts of multivalent metals in which the metal is in its lower state. Representative phenol derivatives useful as stabilizers include 3,5-di-tert-butyl-hydroxy hydrocinnamic triester with 1,3, 5-tris-(2-hydroxyethyl-s-triazine-2,4,6-(1H, 3H, 5H) trione; 4,4'-bis-(2,6-diteriatiary-butyl-phenol); 1,3,5-trimethyl-2,4,6-tris-(3,5-ditertiary-butyl-4-hydroxylbenzyl)benzene and 4,4'-butylidene-bis (6-tertiary-butyl-m-cresol). Various inorganic metal salts or hydroxides can be used as well as organic complexes such as nickel dibutyl dithiocarbamate, manganous salicylate and copper 3-phenylsalicylate. Typical amine stabilizers include N,N'-bis(betanaphthyl)-p-phenylenediamine; N,N'-bis-(1-methylheptyl)-p-phenylenediamine and either phenyl-beta-naphthyl amine or its reaction products with aldehydes. Mixtures of hindered phenols with esters or thiodipropionic, mercaptides and phosphite esters are particularly useful. Additional stabilization to ultraviolet light can be obtained by compounding with various UV absorbers such as substituted benzophenones and/or benzotriazoles.

Particularly useful stabilizers are hindered phenols which include phenols of the formula

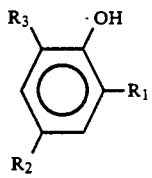

wherein $R_1$ and $R_3$ are hydrocarbon groups having from one to about 20 carbon atoms, and $R_2$ is a hydrogen atom or a hydrocarbon group having from one to about 20 carbon atoms, and bisphenol of the formula

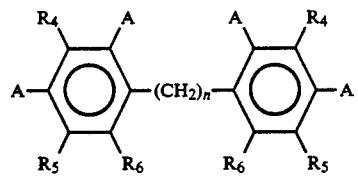

wherein $R_4$, $R_5$ and $R_6$ are each a hydrogen atom or a hydrocarbon group having from one to about 20 carbon atoms, one of the two A's on each ring is a hydroxyl group and the other A on each ring is a hydrogen atom or a hydrocarbon group having from one to about 20 carbon atoms; and n is an integer of from 0 to about 20.

Preferred hindered phenols useful in this invention include 2,6-di-tert-butyl-4-methyl-phenol, commonly known as BHT (sold under the tradename Ionol by Shell Chemical Co.); 4,4-methylene bis(2,6-di-tert-butylphenol) and 2,6-di-tert-butyl-4-n-butylphenol (sold under the tradename Ethyl 702 and Ethyl 744, respectively, by Ethyl Corp.); and tetrakis[methylene 3-(3',5'-di-tert-butyl-4'-hydroxyphenyl) proprionate]-methane and stearyl-3-(3',5'-di-tertbutyl-4'-hydroxyphenyl) proprionate (sold under the tradenames Irganox 1010 and Irganox 1076, respectively, by Ciba-Geigy).

DESCRIPTION OF THE PREFERRED EMBODIMENT

The following examples are presented to more fully and clearly illustrate the present invention. They are presented as illustrative of the invention and are not to be construed as limiting the invention thereto. In the examples all parts and percentages are on a weight basis unless otherwise specified.

In all the examples, the compositions were prepared by melt blending the polyester and the indicated additional components using a Prodex single screw extruder at approximately 470° F. Test specimens were prepared by injection molding in accordance with proper specifications for ASTM and UL determinations.

The following ASTM methods were used in determining the physical characteristics of the compositions:

| | |
|---|---|
| Flexural Modulus | ASTM D790 |
| Tensile Elongation | ASTM D638 |
| Notched Izod | ASTM D256 |
| Tensile Strength | ASTM D638 |
| Flexural Strength | ASTM D790 |

Flammability tests were performed following the procedure of Underwriter's Laboratory Bulletin 94 entitled "Tests for Flammability of Plastic Materials, UL94". According to this procedure, the materials were classified as either UL94 HB, UL94 V-O, UL94 V-I or UL94 V-II on the basis of the test results obtained for five samples. The criteria for each of these flammability classifications according to UL94, are, briefly, as follows:

HB: In a 5 inch sample, placed so that the long axis of the sample is horizontal to the flame, the rate of burn of the sample is less than 3 inches per minute, and the flames should be extinguished before 4 inches of sample are burned.

V-O: In a sample placed so that its long axis is 90° to the flame, the average period of flaming and/or smoldering after removing the igniting flame should not exceed five seconds and none of the vertically placed samples should produce drips of burning particles which ignite absorbent cotton.

V-I: In a sample placed so that its long axis is 90° to the flame, the average period of flaming and/or smoldering after removing the igniting flame should not exceed twenty-five seconds and none of the vertically placed samples should produce drips of burning particles which ignite absorbent cotton.

V-II: In a sample placed so that its long axis is 90° to the flame, the average period of flaming and/or smoldering after removing the igniting flame should not exceed twenty-five seconds and the vertically placed samples produce drips of burning particles which ignite cotton.

Examples 1 and 3 illustrate a composition falling outside the scope of the instant invention and are presented for comparative purposes only. These examples utilize the same components in their composition as the composition of, respectively, Examples 2 and 4, with the exception that the polyetherimide ester elastomer carrier of the present invention which is utilized in the flame retardant additive of Examples 2 and 4 was replaced by a different carrier, ethyl vinyl acetate carrier ("EVA") for comparative purposes. The designation FRC-1 in the Examples stands for the comparative flame retardant additive which comprises halogenated polycarbonate resin, antimony trioxide and EVA in, respectively, the following weight percentages: 67:20:13. The designation FRC-2 stands for the flame retardant additive of the present invention in which, as indicated, the same amount by weight of polyetherimide ester ("PEI") resin is substituted for EVA. The amount, by weight, of the other components in the compositions of Examples 2 and 4 also remained the same relative to, respectively, the compositions of Examples 1 and 3. The PBT (poly (1,4-butylene terephthalate) utilized in the examples was Valox ® 315 from General Electric Company; the halogenated polycarbonate resin utilized was BVC-58 made by Great Lakes Chemical Company, a high molecular weight brominated polycarbonate resin that has 58% brominated polycarbonate; and the impact modifier utilized in Examples 1 and 2 was Paraloid KM-653, from Rohn and Haas, and the polycarbonate utilized was General Electric Company's Lexan ® polycarbonate resin. In all the Examples the resulting polymeric composition was formed, by injection molding, into test bars measuring 2.5 inches×½ inches×⅛ inch. A number of tests were taken of the physical properties of the composition according to the ASTM standards noted above and the test procedure set forth in Underwriters Laboratories UL94 Bulletin, and the results are set forth in Tables II and IV below. All parts in Tables I and III are listed in terms of percent by weight.

An examination of the results of the physical test indicates that, by changing EVA with PEI resin as the carrier for the flame retardant composition, the flame retardant properties of the resulting polyester composition are not changed. However, the indicated change in the carrier resin, which resin only accounts for approximately 2½ weight percent of the total composition, results, for example, when comparing the tested properties of Examples 1 and 2, in no change to the flame retardant properties of the composition, but displays a desirable 28% decrease in melt viscosity, 5% increase in Flexural strength, 7.5% increase Flexural Modulus and a 100% ductility (as compared to an 80% ductility in Example 1), of samples that passed the −26° F. Gardner test. The only physical property in which a decrease was shown was tensile strength, and the percent total decrease was only 2%.

TABLE I

| Composition | EXAMPLE | |
|---|---|---|
| | 1 | 2 |
| PBT | 20.00 | 20.00 |
| Polycarbonate | 47.45 | 47.45 |
| Impact Modifier | 12.00 | 12.00 |
| Stabilizer | 1.25 | 1.25 |
| Teflon Concentrate | 0.30 | 0.30 |
| FRC-1 | 19.00 | — |
| FRC-2 | — | 19.00 |

TABLE II

| Properties | EXAMPLE | |
|---|---|---|
| | 1 | 2 |
| Melt Viscosity at 482° F. poise, | 9,530 | 6,840 |
| −26° F. Gardner at 480 in.-lb., passed/total | 4/5 | 5/5 |
| Unnotched Izod (ft-lb/in) (room temperature) | 40 | 38 |
| Tensile Strength, psi | 8,260 | 8,090 |
| Flexural Strength, psi | 12,130 | 12,700 |
| Flexural Modulus, psi | 306K | 329K |
| UL94 at 1/32" | V-O | V-O |

TABLE III

| Composition | EXAMPLE | |
|---|---|---|
| | 3 | 4 |
| PBT | 56.15 | 56.15 |
| Glass Fiber | 30.0 | 30.0 |
| Stabilizer | 0.55 | 0.55 |
| Teflon Conc. | 0.30 | 0.30 |
| FRC-1 | — | 13.0 |
| FRC-2 | 13.0 | — |

TABLE IV

| Properties | EXAMPLE | |
|---|---|---|
| | 3 | 4 |
| Melt Viscosity at 482° F. poise, | 8779 | 7628 |
| IZOD Impact, Notched | 1.680 | 1.904 |
| IZOD Impact, Unnotched | 14.016 | 13.152 |
| Tensile Strength, psi | 18980 | 19040 |
| Flexural Strength, psi | 30240 | 30580 |
| Flexural Modulus, psi | 1240K | 1022K |
| UL94 at 1/32 | V-O | V-O |

Obviously, other modifications and variations of the present invention are possible in light of the above teachings. It is therefore to be understood that changes may be made in the particular embodiments of the invention described which are within the full intended scope of the invention as defined by the appended claims.

What is claimed is:

1. A flame retardant polyester composition having improved processing characteristics comprising:
    (a) at least one polyester resin; and
    (b) a flame retardant amount of a flame retardant additive comprising a halogenated polycarbonate resin composition and an antimony compound in polyetherimide ester elastomer resin carrier, wherein, in the additive, the halogenated polycarbonate resin is present in amounts ranging from about 60 weight percent to about 70 weight percent based on the total weight of the additive, the antimony compound is present in amounts ranging from about 20 weight percent to about 30 weight percent based on the total weight of the additive and the polyetherimide ester elastomer resin carrier is present in amounts ranging from about 15 weight percent to about 20 weight percent based on the total weight of the additive.

2. The composition of claim 1 wherein the at least one polyester resin is present in the amount of at least about 15 parts to about 75 parts by weight per one hundred parts by weight of the total composition.

3. The composition of claim 2 wherein the amount of polyester resin ranges from about 20 to about 70 parts by weight per one hundred parts by weight of the total composition.

4. The composition of claim 3 wherein the amount of polyester resin ranges from about 25 to about 65 parts by weight per one hundred parts by weight of the total composition.

5. The composition of claim 1 wherein the at least one polyester resin is a high molecular weight linear thermoplastic polyester resin selected from the group consisting of polymeric glycol terephthalate and isophthalate esters having repeating units of the general formula:

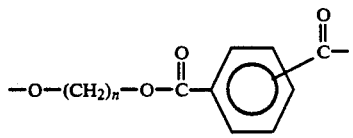

wherein n is an integer of from 2 to 10, or a mixture of such esters.

6. The composition of claim 5 wherein the at least one polyester resin is at least one of poly(1,4-butylene terephthalate) and poly(ethylene terephthalate) ester resins.

7. The composition of claim 1 wherein said polyetherimide ester resin is comprised of the reaction products of:
   (a) at least one diol;
   (b) at least one dicarboxylic acid or an ester forming reactive derivative thereof; and
   (c) a set of reactants selected from
      (1) (i) at least one high molecular weight poly(oxy alkylene)diamine, and (ii) at least one tricarboxylic acid or a derivative thereof, or
      (2) at least one high molecular weight polyoxyalkylene diimide diacid.

8. The composition of claim 7 wherein said diol is a low molecular weight diol.

9. The composition of claim 7 wherein said dicarboxylic acid or its derivative is an aromatic dicarboxylic acid or its derivative.

10. The composition of claim 7 wherein (c) is (1).

11. The composition of claim 10 wherein said high molecular weight poly(oxy alkylene)diamine is represented by the formula

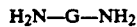

where G is the radical remaining after the removal of the amino groups of a long chain alkylene ether diamine.

12. The composition of claim 10 wherein said tricarboxylic acid or its derivative is represented by the formula

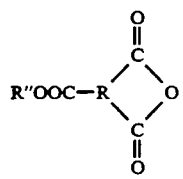

wherein R is a $C_1$ to $C_{20}$ trivalent aliphatic, cycloaliphatic or aromatic radical, and R'' is hydrogen or a $C_1$-$C_6$ aliphatic monovalent radical.

13. The composition of claim 7 wherein (c) is (2).

14. The composition of claim 13 wherein said high molecular weight polyoxyalkylene diimide diacid is represented by the formula

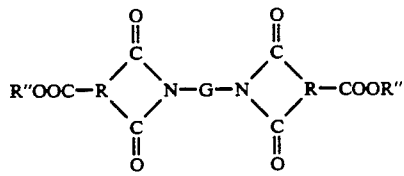

wherein:
   each R is independently selected from $C_1$-$C_{20}$ aliphatic, cycloaliphatic or aromatic trivalent organic radicals;
   each R'' is independently selected from hydrogen, $C_1$-$C_6$ aliphatic or cycloaliphatic organic radicals, or $C_6$-$C_{12}$ aromatic monovalent organic radicals; and
   G is the radical remaining after the removal of the amino groups of a long chain alkylene ether diamine.

15. The composition of claim 1 wherein said polyetherimide ester resin is comprised of at least the following recurring structural units:

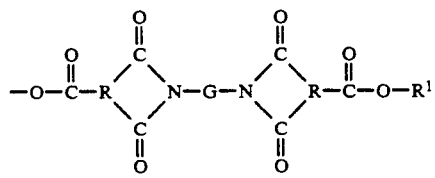

and

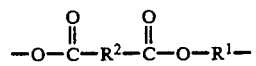

wherein:
   $R^1$ is the residue of a diol absent the two hydroxyl groups;
   $R^2$ is the residue of a dicarboxylic acid absent the two carboxyl groups;
   R is a trivalent organic radical; and
   G is the radical remaining after the removal of the amino groups of a long chain poly(oxy alkylene) diamine.

16. The composition of claim 1 wherein the halogenated polycarbonate compound is a brominated polycarbonate compound.

17. The composition of claim 1 wherein the antimony compound is an inorganic antimony compound.

18. The composition of claim 1 wherein the antimony compound is an organic antimony compound.

19. A composition of claim 1 which further contains a polycarbonate resin of the formula

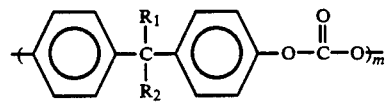

wherein $R_1$ and $R_2$ are independently hydrogen, (lower) alkyl or phenyl and m is at least 30.

20. The composition of claim 19 wherein the aromatic polycarbonate resin is derived from a diphenol and phosgene or a phosgene precursor.

21. The composition of claim 1 which further comprises a resin impact modifier.

22. The composition of claim 21 wherein said impact modifier is a core-shell multi-stage polymer.

23. A composition as defined in claim 22 wherein said multi-stage polymer has a (co-)polymer outer shell.

24. The composition of claim 21 wherein the impact modifier is a polymer comprising a rigid portion and a rubber portion, the rigid portion being formed from at least one monomer selected from the group consisting of styrene, halogen-substituted styrene, alphamethylstyrene and para-methylstyrene, and at least one monomer selected from the group consisting of acrylonitrile, methacrylonitrile, alkyl methacrylate, maleic anhydride, maleimide, alkyl maleimide and aryl maleimide, and the rubber portion including polybutadiene.

25. The composition of claim 1 which further comprises glass fibers.

26. A flame retardant additive which is comprised of (a) a halogenated polycarbonate resin; (b) an antimony compound; and (c) a polyetherimide ester elastomer resin carrier, wherein the halogenated polycarbonate resin is present in amounts ranging from about 60 weight percent to about 70 weight percent based on the total weight of the additive, the antimony compound is present in amounts ranging from about 20 weight percent to about 30 weight percent based on the total weight of the additive and the polyetherimide ester elastomer resin carrier is present in amounts ranging from about 15 weight percent to about 20 weight percent based on the total weight of the additive.

* * * * *